(12) United States Patent
Lee et al.

(10) Patent No.: US 10,098,072 B2
(45) Date of Patent: Oct. 9, 2018

(54) SIGNAL PROCESSING SYSTEM, DIGITAL SIGNAL PROCESSING DEVICE, AND METHOD OF CONTROLLING TRANSMISSION POWER IN THE SYSTEM

(71) Applicant: KT CORPORATION, Gyeonggi-do (KR)

(72) Inventors: Ki-Ho Lee, Gyeonggi-do (KR); Yong-Gyoo Lee, Seoul (KR); Yung-Ha Ji, Gyeonggi-do (KR)

(73) Assignee: KT CORPORATION, Gyeonggi-do (KR)

( * ) Notice: Subject to any disclaimer, the term of this patent is extended or adjusted under 35 U.S.C. 154(b) by 137 days.

(21) Appl. No.: 14/440,500

(22) PCT Filed: Sep. 2, 2013

(86) PCT No.: PCT/KR2013/007911
§ 371 (c)(1),
(2) Date: May 4, 2015

(87) PCT Pub. No.: WO2014/073780
PCT Pub. Date: May 15, 2014

(65) Prior Publication Data
US 2015/0282100 A1 Oct. 1, 2015

(30) Foreign Application Priority Data
Nov. 12, 2012 (KR) .................. 10-2012-0127658

(51) Int. Cl.
*H04W 52/24* (2009.01)
*H04W 52/40* (2009.01)
*H04W 52/28* (2009.01)
*H04B 17/318* (2015.01)
*H04W 88/08* (2009.01)

(52) U.S. Cl.
CPC ........ *H04W 52/245* (2013.01); *H04B 17/318* (2015.01); *H04W 52/283* (2013.01); *H04W 52/40* (2013.01); *H04W 88/08* (2013.01)

(58) Field of Classification Search
None
See application file for complete search history.

(56) References Cited

U.S. PATENT DOCUMENTS

| 8,520,612 B2 | 8/2013 | Yamamoto et al. |
| 2004/0014482 A1 | 1/2004 | Kwak et al. |

(Continued)

FOREIGN PATENT DOCUMENTS

| JP | 2010-220018 A | 9/2010 |
| KR | 10-2003-0086172 A | 11/2003 |

(Continued)

*Primary Examiner* — Duc T Duong
(74) *Attorney, Agent, or Firm* — IP Legal Services, LLC

(57) ABSTRACT

A signal processing system, a digital signal processing device (or a digital unit), and a method of controlling transmission power in the system are provided. The digital unit allocates relatively high transmission power to a terminal located in a boundary area of adjacent cells served by two radio units, which is higher than transmission power for transmitting data to a terminal located at about a central area of each cell, rather than the boundary cell of adjacent cells.

10 Claims, 5 Drawing Sheets

(56) References Cited

U.S. PATENT DOCUMENTS

| | | | |
|---|---|---|---|
| 2004/0106412 A1* | 6/2004 | Laroia | H04W 16/12 455/448 |
| 2010/0210276 A1 | 8/2010 | Jang | |
| 2010/0255852 A1* | 10/2010 | Chen | H04W 72/082 455/450 |
| 2010/0279700 A1 | 11/2010 | Kim et al. | |
| 2010/0290413 A1 | 11/2010 | Kuwahara | |
| 2011/0028156 A1* | 2/2011 | Zhu | H04B 7/024 455/450 |
| 2011/0085448 A1* | 4/2011 | Kuwahara | H04W 16/10 370/242 |
| 2011/0090861 A1* | 4/2011 | Kim | H04W 72/082 370/329 |
| 2012/0014274 A1* | 1/2012 | Muraoka | H04W 52/0206 370/252 |
| 2012/0093108 A1* | 4/2012 | Wengerter | H04W 52/243 370/329 |
| 2012/0327909 A1* | 12/2012 | Koike | H04W 24/08 370/331 |
| 2013/0003669 A1* | 1/2013 | Ohara | H04W 72/0453 370/329 |
| 2013/0252620 A1* | 9/2013 | Kobayashi | H04W 52/325 455/446 |
| 2013/0337844 A1* | 12/2013 | Meredith | H04W 64/00 455/456.5 |
| 2014/0073369 A1* | 3/2014 | Senarath | H04W 52/226 455/509 |
| 2014/0105180 A1* | 4/2014 | Grant | H04W 36/30 370/332 |
| 2014/0106769 A1* | 4/2014 | Bai | H04W 52/244 455/452.1 |
| 2014/0112216 A1* | 4/2014 | Seo | H04J 11/005 370/280 |
| 2014/0286289 A1* | 9/2014 | Nagata | H04L 1/0029 370/329 |
| 2014/0287770 A1* | 9/2014 | Liu | H04W 64/006 455/450 |
| 2015/0156782 A1* | 6/2015 | Manssour | H04J 11/0056 455/452.1 |
| 2015/0257130 A1* | 9/2015 | Lee | H04W 72/042 370/336 |

FOREIGN PATENT DOCUMENTS

| | | |
|---|---|---|
| KR | 10-2010-0094765 A | 8/2010 |
| KR | 10-2010-0118944 A | 11/2010 |

\* cited by examiner

SIGNAL PROCESSING SYSTEM, DIGITAL SIGNAL PROCESSING DEVICE, AND METHOD OF CONTROLLING TRANSMISSION POWER IN THE SYSTEM

CROSS REFERENCE TO RELATED APPLICATIONS

This application is a National Stage Patent Application of PCT International Patent Application No. PCT/KR2013/007911 (filed on Sep. 2, 2013) under 35 U.S.C. § 371, which claims priority to Korean Patent Application No. 10-2012-0127658 (filed on Nov. 12, 2012), the teachings of which are incorporated herein in their entireties by reference.

BACKGROUND OF THE INVENTION (a) Field of the Invention

The present disclosure relates to a signal processing system, a digital signal processing device, and a method of controlling transmission power in the system.

(b) Description of the Related Art

In general, in a communication base station, a digital signal processing unit (hereinafter referred to as a "digital unit (DU)") and a radio signal processing unit (hereinafter referred to as a "radio unit (RU)") are included in a single physical system. However, in such a system, a base station including all of processing units should be installed in a cell, thus having a limitation in optimization of designing a cell. Thus, it is difficult to improve radio capacity. In order to solve the problem, only an antenna component and an RF component processing a radio signal are remotely separated to form a radio unit (RU), and a plurality of RUs are connected to a single digital unit (DU).

Meanwhile, RUs corresponding to a base station adjust power of a signal transmitted to a terminal according to a location of the terminal. However, the RUs do not adjust transmission power according to a location of a terminal in consideration of interference between adjacent cells.

Thus, it is required to adjust transmission power according to a location of a terminal within a cell for the purpose of controlling interference between adjacent cells.

The above information disclosed in this Background section is only for enhancement of understanding of the background of the invention and therefore it may contain information that does not form the prior art that is already known in this country to a person of ordinary skill in the art.

SUMMARY OF THE INVENTION

Embodiments of the present disclosure have been made in an effort to provide a signal processing system, a digital signal processing apparatus, and a method of controlling transmission power in the system having advantages of reducing inter-cell interference and improving performance of a terminal in a boundary area by differentiating transmission power for transmitting data according to a location of a terminal.

An exemplary embodiment of the present disclosure provides a signal processing system including:

a digital unit connected to a core system and configured to process a radio digital signal; and a plurality of radio units physically separated from the digital unit, configured to convert and amplify a digital signal received from the digital unit and transmit the same to a terminal, and configured to receive a signal transmitted from the terminal and transfer the same to the digital unit, wherein the digital unit allocates relatively high transmission power to a terminal located in a boundary area of adjacent cells served by two radio units among the plurality of radio units, which is higher than transmission power for transmitting data to a terminal located at about central area of each cell, rather than the boundary area of each cell.

The digital unit may determine whether the terminal is located in the boundary area based on signal strength values of the terminal, measured by and transferred from the two radio units, and transmission powers of the two radio units.

The digital unit may determine whether the terminal is located in the boundary area using an equation of $|A-|X-Y|-B| \le T$, where X and Y respectively denote transmission powers of of the two radio units, and A and B respectively denote the signal strength values measured by and transferred from the two radio units, wherein A is a signal strength value measured by and transferred from a radio unit having transmission power X, B is a signal strength value measured by and transferred from a radio unit having transmission power Y, and T is an integer equal to or greater than 0.

Transmission power for transmitting data to the terminal located in the boundary of each cell may be about maximum power for transmitting data to the terminal, and transmission power for transmitting data to the terminal located within each cell, rather than the boundary area, may not be the maximum power.

Another embodiment of the present disclosure provides a signal processing system including:

a first base station providing radio communication within a first cell; and a second base station providing radio communication within a second cell, wherein when the first cell and the second cell are adjacent to each other to form a boundary area, the first base station and the second base station transmit data by using first transmission power to a terminal located in the boundary area, and transmit data by using second transmission power to a terminal located in about central region of one of the first cell and the second cell, rather than the boundary area, wherein the first transmission power is higher than the second transmission power.

The signal processing system may further include a common control unit configured to control the first base station and the second base station, wherein the common control unit allocates the first transmission power and the second transmission power to at least one of the first base station and the second base station.

The first base station and the second base station may receive a radio signal transmitted from a terminal, calculate a signal strength value of uplink of the corresponding terminal, and transfer the calculated signal strength value to the common control unit, and the common control unit may receive the signal strength values transferred from the first base station and the second base station and compare the received signal strength values with transmission powers of the first base station and the second base station to determine whether the corresponding terminal is located in the boundary area.

When the corresponding terminal is located in the boundary area, the common control unit may allocate the first transmission power to associated one of the first base station and the second base station, and when the corresponding terminal is located in the about central region other than the boundary area, the common control unit may allocate the second transmission power to associated one of the first base station and the second base station.

Yet another embodiment of the present disclosure provides a digital unit installed in a service region, separated from a plurality of radio units processing a radio signal, and processing a radio signal from the plurality of radio units, including:

a receiving unit configured to receive, from two radio units among the plurality of radio units, signal strength values of radio signals transmitted from a terminal and received by the two radio units; a determining unit configured to determine whether the terminal is located in a boundary area of adjacent cells respectively served by the two radio units based on the signal strength values received through the receiving unit and transmission powers of the two radio units; and a processing unit configured to, when the terminal is located in the boundary area of the adjacent cells served by the two radio units, transmit data to the terminal with transmission power higher than transmission power for transmitting data to a terminal not located in the boundary area of the cells.

The processing unit may allocate about maximum transmission power to a radio unit which transmits data to the terminal located in the boundary area of the cells.

Still another embodiment of the present disclosure provides a method for controlling transmission power by a unit that commonly manages radio units respectively included in a plurality of cells and providing radio communication to a terminal within a cell, the method including:

determining whether a terminal is located in a boundary area of two adjacent cells; when the terminal is located in the boundary area, allocating relatively high transmission power to the terminal located in the boundary area, which is higher than transmission power to be allocated to a terminal not located in the boundary area; and transmitting, by a radio unit, data to the terminal by using the allocated transmission power.

Before the determining, the method may further include: receiving, by two radio units respectively located in the two cells, radio signals from the terminal; measuring, by the two radio units, signal strength values of the received radio signals; and transferring, by the two radio units, the measured signal strength values to the unit.

In the determining, it may be determined whether the terminal is located in the boundary area based on the signal strength values transferred from the two radio units and the transmission powers of the two radio units.

According to exemplary embodiment of the present disclosure, inter-cell interference may be reduced by differentiating transmission power for transmitting data according to a location of a terminal.

In particular, since a location of a terminal can be tracked in real time, power may be accurately controlled. Thus, performance of a terminal located in a boundary area between cells may be improved.

DETAILED DESCRIPTION OF THE EMBODIMENTS

Figure 1:
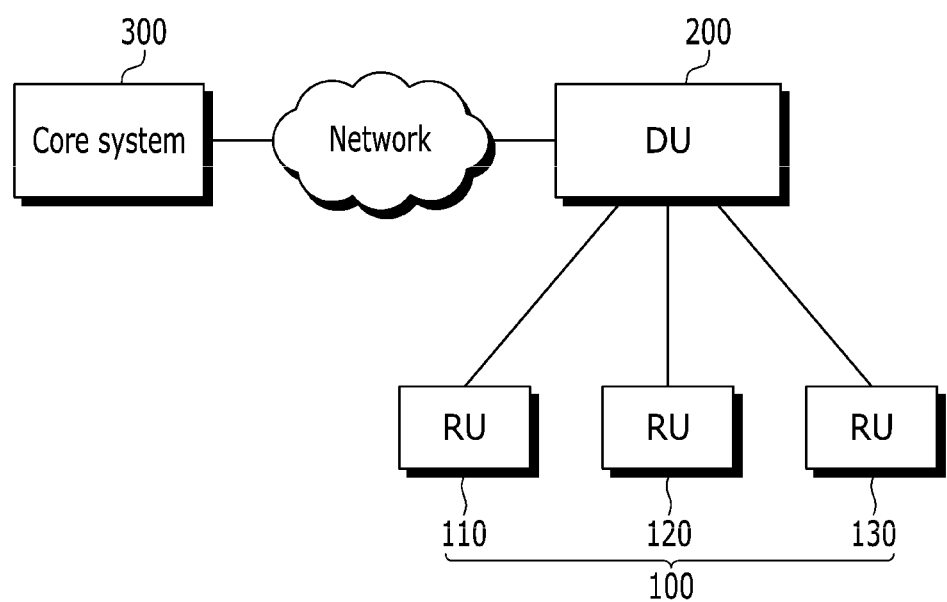
FIG. 1 is a schematic block diagram of a network according to an exemplary embodiment of the present disclosure.
Figure 2:
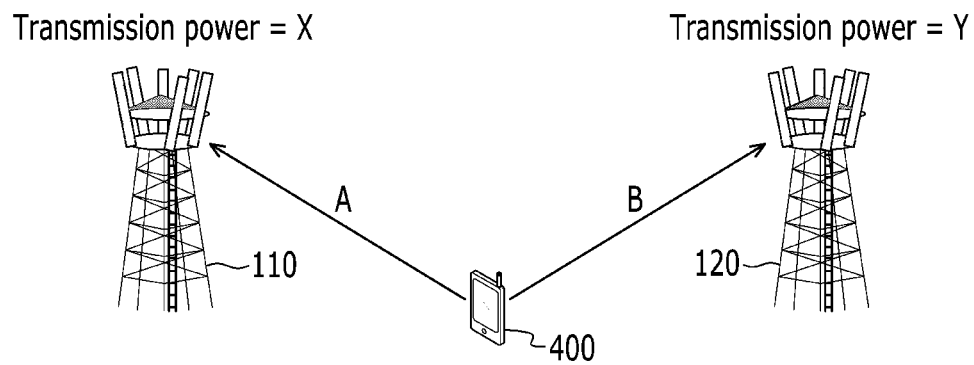
FIG. 2 is a view illustrating an example of obtaining information for determining whether a terminal is located in a boundary area for controlling transmission power according to an exemplary embodiment of the present disclosure.

In the following detailed description, only certain exemplary embodiments of the present disclosure have been shown and described, simply by way of illustration. As those skilled in the art would realize, the described embodiments may be modified in various different ways, all without departing from the spirit or scope of the present disclosure. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and operation, and can be implemented by hardware components or software components and combinations thereof.

Throughout the specification, a terminal may refer to a mobile station (MS), a mobile terminal (MT), a subscriber station (SS), a portable subscriber station (PSS), user equipment (UE), and an access terminal (AT), and may include the entirety or a portion of functions of a terminal, an MT, an SS, a PSS, a UE, an AT, and the like.

Also, a base station (BS) may refer to an access point (AP), a radio access station (RAS), a node B, an evolved node B (eNodeB), a base transceiver station (BTS), a mobile multihop relay (MMR)-BS, or the like, and may include the entirety or a portion of functions of an AP, an RAS, a node B, an eNodeB, a BTS, an MMR-BS, and the like.

First, a network architecture to which at least one embodiment of the present disclosure is applied will be described with reference to FIG. 1.

FIG. 1 is a schematic block diagram of a network according to an exemplary embodiment of the present disclosure.

Referring to FIG. 1, a network according to according to an exemplary embodiment includes a radio unit (RU) 100, a digital unit (DU) 200, and a core system 300. The RU 100 and the DU 200 constitute a signal processing system for wireless communication.

The RU 100 is a part for processing a radio signal. The RU 100 converts a digital signal received from the DU 200 into a radio frequency (RF) signal according to a frequency band, amplifies the same, and transmits the amplified signal to a terminal through an antenna. The UR 100 receives a signal from a terminal through an antenna, processes the received signal, and transmits the processed signal to the DU 100.

A plurality of RUs 110, 120, and 130 are connected to the DU 200, and each RU 100 is installed in a service target area, namely, a cell. The RU 100 and the DU 200 may be connected by an optical cable.

The DU 200 encrypts or decrypts a radio digital signal and is connected to the core system 300. Unlike the RU 100, the DU 200 is a server that is largely concentratedly installed in a local telecommunication office, rather than being installed in the service target area. That is, the DU 200 is a virtualized base station. The DU 200 transmits and receives signals to and from the plurality of RUs 100.

A typical communication base station includes processing units corresponding to the RU 100 and the DU 200, and a single physical system is installed in a service target area. In contrast, the system according to an exemplary embodiment physically separates the RU 100 and the DU 200, and only the RU is installed in a service target area.

The core system 300 processes connection between the DU 200 and an external network, and the core system 300 includes a switching system (not shown), or the like.

Hereinafter, a method of determining whether a terminal is located in a boundary area for controlling transmission power according to an exemplary embodiment will be described.

First, it is assumed that cells served by two RUs 110 and 120 are so adjacent that power transmitted from the two RUs 110 and 120 may interfere with each other.

It is assumed that base station transmission power of the RU 110 is X, base station transmission power of the RU 120 is Y, and the DU 200 already knows the transmission power X and Y.

Each of the two RUs 110 and 120 measures signal strength of an uplink signal received from a terminal 400 and transmits the measured signal strength to the DU 200. Then, the DU 200 determines whether the terminal 400 is located in a boundary area of the terminal 400 on the basis of a signal strength value A received from the RU 110 and a signal strength value B received from the RU 120 and the transmission power X and Y of the two RUs 110 and 120.

That is, when an absolute value of a value obtained by subtracting a difference between the transmission power X and Y from a difference between the signal strength value A and the signal strength value B is equal to or smaller than a threshold value T as expressed by Equation 1 below, it is determined that the terminal 400 is located in a boundary area between cells respectively formed by the two RUs 110 and 120.

$$|A-|X-Y|-B| \le T \text{ (unit is dB), where } T \text{ is an integer equal to or greater than 0.} \quad \text{[Equation 1]}$$

As can be seen in Equation 1, when the transmission powers of the two RUs 110 and 120 are equal or a difference therebetween is very small, X−Y≈0. Accordingly, it corresponds to a case in which the difference between the transmission powers X and Y of the two RUs 110 and 120 is equal to or smaller than T, and thus the boundary area of the two cells is located in about a central region between the two cells.

However, when transmission powers of the two RUs 110 and 120 are different and a difference therebetween is so significantly large that the X−Y or Y−X has a large value, a value obtained by subtracting the difference between the transmission powers X and Y from the difference between the signal strength values A and B received from the two RUs 110 and 120, as well as only the difference between the signal strength values A and B, should be equal to or smaller than T. Accordingly, a boundary area of two cells is located in a region leaning to one of the two cells between the two cells.

Meanwhile, for the signal strength of an uplink signal received by the two RUs 110 and 120 from the terminal 400, various signals may be used. For example, a sounding reference signal (SRS) may be used. In this case, the terminal transmits the SRS as a signal for uplink scheduling, and a BS estimates an uplink channel using the SRS received from the terminal and allocates uplink frequency resources to the terminal according to the estimation results.

The SRS may be transmitted through the last symbol in a time axis of one subframe. SRSs of various terminals transmitted through symbols of the same subframe may be differentiated according to frequency positions or sequences. Such SRSs are well known, and thus a detailed description thereof will be omitted.

Figure 3:
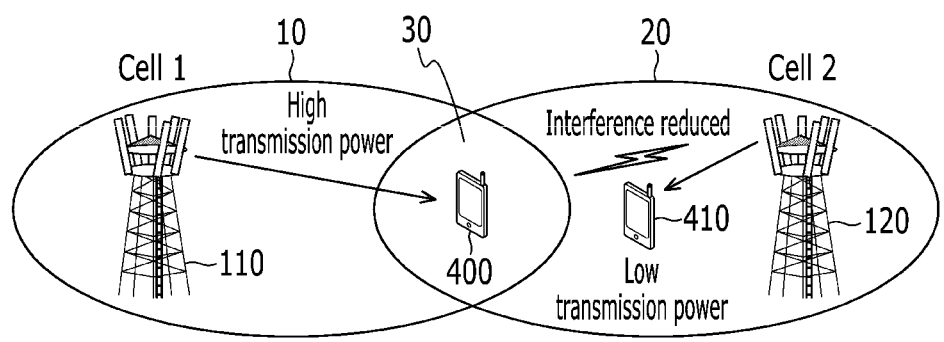
FIG. 3 is a view schematically illustrating a method of controlling transmission power according to an exemplary embodiment of the present disclosure.

FIG. 3 is a view schematically illustrating a method of controlling transmission power according to an exemplary embodiment.

Referring to FIG. 3, a cell 1 10 is a service region of the RU 110, and a cell 2 20 is a service region of the RU 120. A boundary area 30 is a region formed as the cell 1 10 and the cell 2 20 are adjacent to each other.

In an exemplary embodiment, the DU 200 determines the boundary area 30 on the basis of an SRS transmitted from the terminal 400 through the RUs 110 and 120. The RU 120 transmits a signal with relatively low power to a terminal 410 located within the cell 20, not the boundary area 30, and transmits a signal with relatively higher power than the power transmitted to the terminal 410, to a terminal 400 positioned in the boundary area 30.

Here, the relatively low power and the relatively high power may be basically relative values, and such power values may be set in advance through statistical data such as measurement data or experimental data. For example, the relatively high power may be maximum power that can be applied to a signal transmitted to the terminal 400, and the relatively low power may be power less than the maximum power.

In this manner, since the RU 120 transmits a signal with relatively low power to the terminal 410 positioned about a central are of the cell, inter-cell interference with respect to the terminal 400 may be reduced. Thus, an influence of interference to the terminal 400 positioned in the boundary area 30 between the adjacent cells 10 and 20 may be reduced, thus improving performance of the terminal 400 positioned in the adjacent cells 10 and 20.

Figure 4:
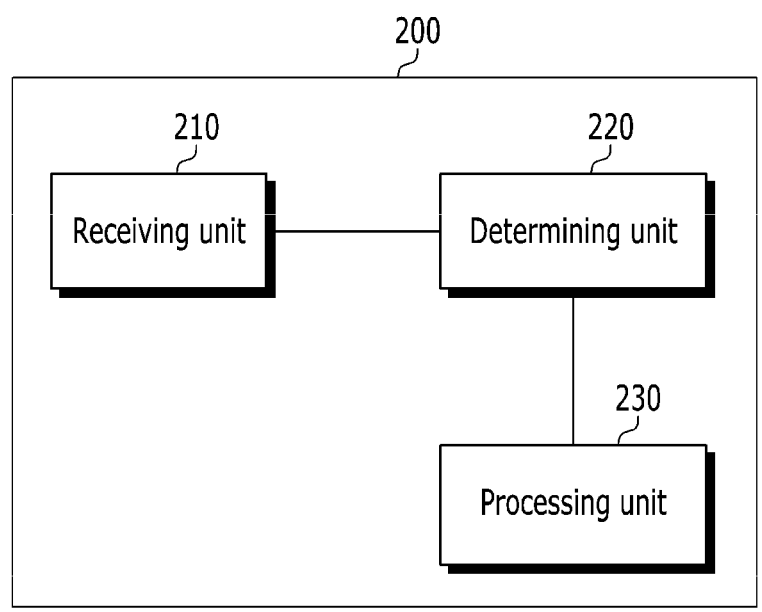
FIG. 4 is a block diagram of a digital unit (DU) according to an exemplary embodiment of the present disclosure.

FIG. 4 is a block diagram of a digital unit (DU) according to an exemplary embodiment.

Referring to FIG. 4, the DU 200 includes a receiving unit 210, a determining unit 220, and a processing unit 230.

The receiving unit 210 receives a signal strength value of the terminal 400 from the RUs 110 and 120. The signal strength value of the terminal 400 may be measured by the RUs 110 and 120 after receiving a radio signal transmitted from the terminal 400. Such a radio signal may be, for example, an SRS.

The determining unit 220 determines a region where the terminal is located by performing calculation using Equation 1 on the basis of the signal strength value received by the receiving unit 210 and transmission powers of the RUs 110 and 120. That is, the determining unit 220 determines whether the terminal which has transmitted the radio signal is located in the boundary area 30 of the cells 10 and 20 or is located at about a central area of one of the cells 10 and 20.

The processing unit 230 controls transmission power for data transmission of the RUs 110 and 120 according to determination of the determining unit 220. In particular, when the terminal is located at about a central area of one of the cells 10 and 20, rather than in the boundary area 30 of the RUs 110 and 120, the processing unit 230 controls transmission of data with relatively low power. However, when the terminal is located in the boundary area 30 of the RUs 110 and 120, the processing unit 230 controls transmission of data with relatively high power.

Thus, each of the RUs 110 and 120 transmits data to the terminal according to transmission power values controlled by the processing unit 230 of the DU 200.

Figure 5:
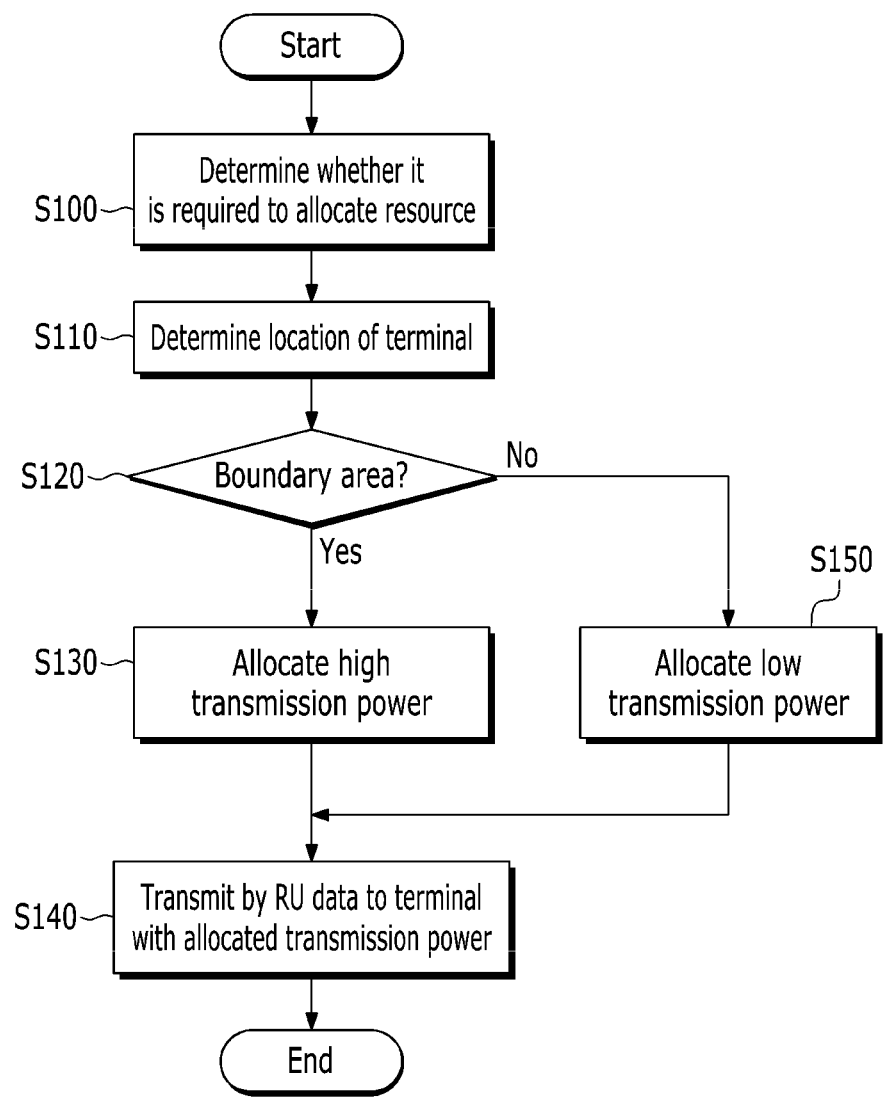
FIG. 5 is a flowchart illustrating a method of controlling transmission power according to an exemplary embodiment of the present disclosure.

Hereinafter, a method of controlling transmission power according to an exemplary embodiment will be described with reference to FIG. 5.

The method of controlling transmission power will be described based on assumptions: i) the terminal 400 located within the cell 10 or 20 transmits an SRS to the RUs 110 and 120; ii) the RUs 110 and 120 calculate signal strength values of an uplink signal of the terminal 400, respectively, through the SRS received from the terminal 400; and iii) the RUs 110 and 120 transmit the calculated signal strength values to the DU 200. The embodiments of the present disclosure, however, are not limited thereto.

The DU 200 determines that it is required to allocate resources to the terminal 400 (S100). The DU 200 determines a region in which the terminal 400 is located by performing calculation using Equation 1 on the basis of signal strength values of the terminal 400 received from the RUs 110 and 120 and the transmission powers of the RUs 110 and 120 (S110).

When it is determined that the terminal 400 is located in the boundary area 30 (S120), the DU 200 allocates relatively high power, for example, maximum power, to the terminal 400 (S130).

Thus, the RUs 110 and 120 are allocated with the relatively high power to transmit data to the terminal 400 and the RUs 110 and 120 transmit data to the corresponding terminal 400 by using predetermined relatively high power (S140).

However, when it is determined that the terminal 400 is located at about a central area of one of the cell 10 and 20 rather than in the boundary area 30 in step (S120), the DU 200 allocates relatively low power, for example, less than the maximum power, to the corresponding terminal 400 (S150).

Thus, the RUs 110 and 120 are allocated with relatively low power to transmit data to the terminal 400, and the URs 110 and 120 transmit data to the corresponding terminal 400 by using predetermined relatively low power (S140).

Meanwhile, in the above, the DU and the RUs have been described, but the scope of the embodiments of the present disclosure is not limited thereto. For example, it may be easily understood by a person skilled in the art that any base station which provides wireless communication within a cell corresponds to the RU and any common control unit which commonly controls such base stations corresponds to the DU.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A signal processing system comprising:
a digital signal processing apparatus connected to a core system and configured to process a radio digital signal; and
a plurality of base stations physically separated from the digital signal processing apparatus, configured to convert and amplify a digital signal received from the digital signal processing apparatus and transmit the amplified digital signal to a terminal, configured to receive a signal transmitted from the terminal and transfer the received signal to the digital signal processing apparatus,
wherein the digital signal processing apparatus allocates relatively high transmission power for transmitting data to a terminal located in a boundary area of adjacent cells each respectively served by a first base station and a second base station among the plurality of base stations, and controls at least one of the first base station and the second base station to transmit data to the terminal with the allocated relatively high transmission power, where the relatively high transmission power is higher than transmission power for transmitting data to a terminal located at about a central area of each cell, rather than the boundary area,
wherein the digital signal processing apparatus configured to determine whether the terminal is located in the boundary area based on i) a first signal strength value of the terminal, measured by and transferred from the first base station, ii) a second signal strength value of the same terminal, measured by and transferred from the second base station, and iii) a difference between first transmission power of the first base station and second transmission power of the second base station.

2. The signal processing system of claim 1, wherein the digital signal processing apparatus determines whether the terminal is located in the boundary area using an equation of:

$$|A-|X-Y|-B| \leq T,$$

where X and Y respectively denote the first and second transmission powers of the first and second base stations, and A and B respectively denote the first and second signal strength values from the first and second base stations, wherein A is the first signal strength value measured by and transferred from the first base station having the first transmission power X, B is the second signal strength value measured by and transferred from the second base station having the second transmission power Y, and T is an integer equal to or greater than 0.

3. The signal processing system of claim 1, wherein transmission power for transmitting data to the terminal located in the boundary is maximum power for transmitting data to the terminal, and transmission power for transmitting data to the terminal located at a central area of each cell, rather than the boundary area, is not equal to and less than the maximum power.

4. A signal processing system comprising:
a first base station providing radio communication within a first cell;
a second base station providing radio communication within a second cell; and
a digital signal processing apparatus configured to control the first base station and the second base station,
wherein when the first cell and the second cell are adjacent to each other to form a boundary area, the first base station and the second base station transmit data by using first transmission power to a terminal located in the boundary area, and transmit data by using second transmission power to a terminal located in about a central region of one of the first cell and the second cell, rather than the boundary area,
wherein the first transmission power is higher than the second transmission power, and
wherein the digital signal processing apparatus configured to determine whether the terminal is located in the boundary area based on i) a first signal strength value of the terminal, measured by and transferred from the first base station, ii) a second signal strength value of the same terminal, measured by and transferred from the second base station, and iii) a difference between the first transmission power of the first base station and the second transmission power of the second base station.

5. The signal processing system of claim 4, further comprising a digital signal processing apparatus configured to control the first base station and the second base station, wherein the digital signal processing apparatus allocates the first transmission power and the second transmission power to at least one of the first base station and the second base station.

6. The signal processing system of claim 5, wherein the first base station and the second base station receive a radio signal transmitted from a terminal, calculate a signal strength value of uplink of the corresponding terminal, and transfer the calculated signal strength value to the digital signal processing apparatus, and the digital signal processing apparatus receives the signal strength values transferred from the first base station and the second base station and compares the received signal strength values with transmission powers of the first base station and the second base station to determine whether the corresponding terminal is located in the boundary area.

7. The signal processing system of claim 6, wherein, when the corresponding terminal is located in the boundary area, the digital signal processing apparatus allocates the first transmission power to associated one of the first base station and the second base station, and when the corresponding terminal is located in the about central region other than the boundary area, the digital signal processing apparatus allocates the second transmission power to associated one of the first base station and the second base station.

8. A digital signal processing apparatus installed in a service region, separated from a plurality of base stations processing a radio signal, and processing a radio signal from the plurality of base stations, the digital signal processing apparatus including a processor, a memory, and a communication circuit,
wherein the processor is configured to:
receive, from a first base station among the plurality of base stations, a first signal strength value of radio signals transmitted from a terminal to the first base station;
receive, from a second base station among the plurality of base stations, a second signal strength value of radio signals transmitted from the terminal to the second base station;
determine whether the terminal is located in a boundary area of adjacent cells respectively served by the first and second base stations based on the received first and second signal strength values and a difference between first transmission power of the first base station and second transmission power fo the second base station; and
when it is determined that the terminal is located in the boundary area of the adjacent cells served by the first and second base stations, transmit data to the terminal with transmission power higher than transmission power for transmitting data to a terminal not located in the boundary area of the cells.

9. The digital signal processing apparatus of claim 8, wherein the digital signal processing apparatus allocates maximum transmission power to a base station which transmits data to the terminal located in the boundary area of the cells.

10. A method for controlling transmission power by an apparatus that commonly manages base stations respectively included in a plurality of cells and providing radio communication to a terminal located in a cell, the method comprising:
receiving, from a first base station among a plurality of base stations, a first signal strength value of radio signals transmitted from a terminal to the first base station;
receiving, from a second base station among the plurality of base stations, a second signal strength value of radio signals transmitted from the terminal to the second base station;
determining whether the terminal is located in a boundary area of two adjacent cells each respectively served by the first and second base station, based on the received first and second signal strength values and a difference between first transmission power of the first base station and second transmission power of the second base station;
when the terminal is located in the boundary area, allocating transmission power higher than transmission power to be allocated to a terminal not located in the boundary area; and
transmitting, by a base station, data to the terminal by using the allocated transmission power.

* * * * *